(No Model.)
H. G. OSBURN.
STORAGE BATTERY PLATE.
No. 479,835. Patented Aug. 2, 1892.
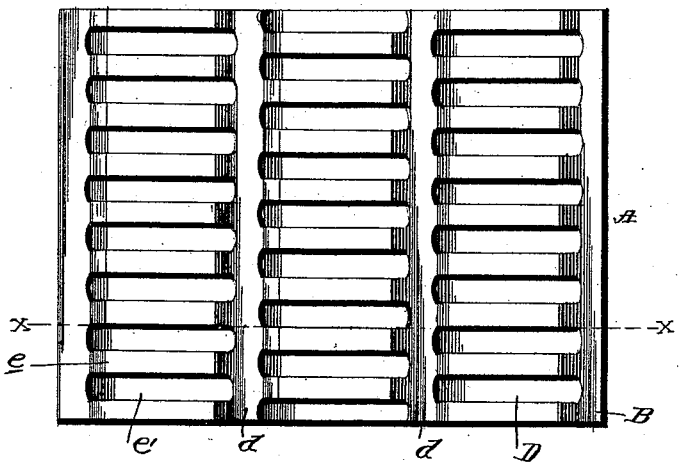
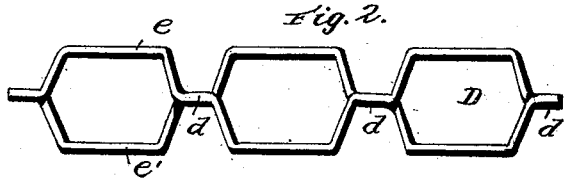
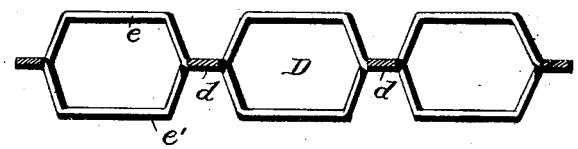
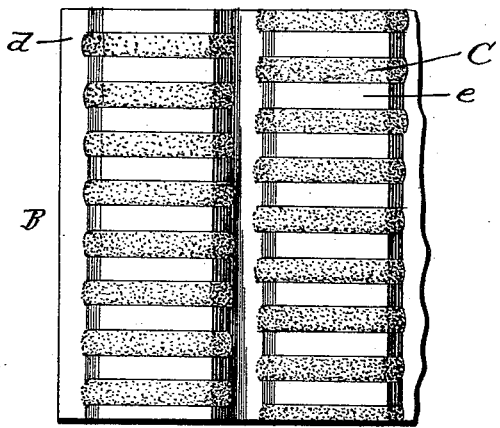
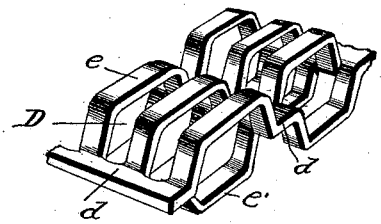
Witnesses
C. H. Raeder
M. F. Matthews.
Inventor
Harry G. Osburn
By James Sheehy
Attorney
THE NORRIS PETERS CO., PHOTO-LITHO., WASHINGTON, D. C.

UNITED STATES PATENT OFFICE.

HARRY G. OSBURN, OF CHICAGO, ILLINOIS.

STORAGE-BATTERY PLATE.

SPECIFICATION forming part of Letters Patent No. 479,835, dated August 2, 1892.

Application filed November 21, 1891. Serial No. 412,663. (No model.)

*To all whom it may concern:*

Be it known that I, HARRY G. OSBURN, a citizen of the United States, residing at Chicago, in the county of Cook and State of Illinois, have invented certain new and useful Improvements in Storage-Batteries; and I do declare the following to be a full, clear, and exact description of the invention, such as will enable others skilled in the art to which it appertains to make and use the same.

My invention relates to a grid or plate forming part of an electrode for a secondary battery, and is designed as an improvement upon the plate shown and described in my application for Letters Patent filed April 7, 1891, Serial No. 387,921, in which a plate is shown as comprising a series of longitudinal parallel receptacles or cells connected by integral webs which, as compared with the diameter or width of the receptacles, are quite thin and arranged centrally of said receptacles, which latter are provided with transverse slots or openings. The object in view is to provide a cheap and durable grid capable of effectively retaining the active material and exposing to the electrolyte an increased surface area of said active material, which in the practical operation of the battery effects an increased discharge of the current.

With these ends in view the invention consists in a grid or plate comprising a series of longitudinal webs and a multiplicity of transverse ribs or bars between each pair of webs, the whole being made in one piece, the transverse ribs or bars beginning at one web and ending at the other web, one-half of the series of ribs being deflected above or to one side of the webs and the alternate ribs being deflected in the opposite direction on the other side or below the webs, the series of ribs forming longitudinal receptacles in the grid or plate when viewed in end elevation, The invention further consists in the peculiar construction and adaptation of parts, as will be hereinafter more fully described.

In the accompanying drawings, Figure 1 is a plan view. Fig. 2 is an end view. Fig. 3 is a transverse section in the line $x\ x$ of Fig. 1. Fig. 4 is a view of the grid or plate filled with the active material, and Fig. 5 is a detail perspective view of a part of the grid or plate.

Referring by letter to said drawings, the electrode A comprises, essentially, a supporting grid or plate B and a filling of active material C, preferably peroxide of lead.

The grid B may be made of sheet or cast lead, or it may be made of other suitable material. I prefer to fill the grid with the active material; but when the grid or plate is made of metal sheet-lead is preferably used, because it can be struck up by a die in the proper form in a cheap and expeditious way, and it can bend or twist when the battery receives a shock or jar, whereby the active material is effectively retained in place or prevented from falling off the grid, because the construction of the same tends to keep the active material in the receptacles formed by the plate from coming together. Furthermore, the sheet-lead can be bent to its original form without detaching the active material.

The plate or grid comprises a series of longitudinal webs $d\ d$ and two series of transverse ribs or bars $e\ e'$ between each pair of longitudinal webs, the whole being made integral and forming a plate or grid with longitudinal receptacles for the retention of the active material. A very large number of the transverse ribs or bars is formed in the plate; but each bar or rib begins at one web and ends at the adjacent web. The transverse ribs designated at $e$ are deflected or bent to one side of the webs $d\ d$, and the alternate ribs $e'$ are deflected in the opposite direction or to the other side of the webs, and as these alternately-deflected ribs are very close together they form a longitudinal receptacle D, which extends between the parallel webs $d\ d$, as shown. In the manufacture of my improved grid from sheet-lead I employ dies of suitable form and construction, which at one operation press the ribs or bars $e\ e'$ out of the sheet and leave the webs $d$ integral with the bars; but in making the grid of cast-lead suitable molds are used for giving the grid its desired form.

The active material C may be in either a plastic or powdered form, and is pressed or worked into the receptacles D, formed by the transverse ribs, said active material completely filling the interior of the receptacle and the spaces or slots between the bars or ribs of the grid, the projecting surfaces between the ribs or bars of the active material serving to key and retain the mass of active material in place.

I am thus enabled to produce a simple and cheap electrode having a grid or plate of sufficient strength and body to sustain the active material, and at the same time an increased surface area of active material is exposed to the action of the electrolyte, which is advantageous in the practical operation of the battery as the same effects an increased discharge of electric energy. The electrode presents a continuous or connected mass of active material effectively retained in place by a grid which is very light in weight and can bend under a jar or shock sustained by the battery and be rebent and restored to its position without in any way detaching the active material.

Having described my invention, what I claim is—

1. In a secondary-battery electrode, a grid or plate consisting of longitudinal webs and the transverse ribs or bars deflected alternately in opposite directions, substantially as described.

2. In a secondary-battery electrode, a grid or plate having a multiplicity of connected ribs or bars which are deflected in opposite directions and form open receptacles for active material, substantially as described.

3. In a secondary-battery electrode, a grid or plate having the longitudinal webs $d$ and the transverse ribs or bars $e\ e'$ integral therewith and deflected alternately in opposite directions to form a series of open receptacles for the reception and exposure of active material, substantially as described.

In testimony whereof I affix my signature in presence of two witnesses.

HARRY G. OSBURN.

Witnesses:
WILMA M. ROE,
FRANK S. WOODS.